(12) United States Patent
Deneuve et al.

(10) Patent No.: US 11,519,340 B2
(45) Date of Patent: Dec. 6, 2022

(54) SYSTEM AND METHOD FOR CONTROLLING A SPEED OF ROTATION OF AN AIRCRAFT TURBINE ENGINE WITH FAULT MANAGEMENT

(71) Applicant: SAFRAN AIRCRAFT ENGINES, Paris (FR)

(72) Inventors: Sébastien Jean Fernand Deneuve, Moissy-Cramayel (FR); Christophe Marc Alexandre Le Brun, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/414,431

(22) PCT Filed: Dec. 17, 2019

(86) PCT No.: PCT/FR2019/053101
§ 371 (c)(1),
(2) Date: Jun. 16, 2021

(87) PCT Pub. No.: WO2020/128286
PCT Pub. Date: Jun. 25, 2020

(65) Prior Publication Data
US 2022/0090543 A1    Mar. 24, 2022

(30) Foreign Application Priority Data
Dec. 21, 2018  (FR) .................................... 1873857

(51) Int. Cl.
*F02C 9/26* (2006.01)
*F02C 9/32* (2006.01)
*F02C 9/46* (2006.01)

(52) U.S. Cl.
CPC ................ *F02C 9/263* (2013.01); *F02C 9/32* (2013.01); *F02C 9/46* (2013.01);
(Continued)

(58) Field of Classification Search
CPC .... F02C 9/26; F02C 9/263; F02C 9/32; F02C 9/28; F02C 9/46; F02C 7/232; F02C 9/44; F05D 2270/094; F05D 2260/80
See application file for complete search history.

(56) References Cited

U.S. PATENT DOCUMENTS 5,279,107 A * 1/1994 Meisner .................... F02C 9/28
                                                    60/773
7,826,954 B2 * 11/2010 Muramatsu ........... F01D 21/003
                                                    701/30.9
(Continued)

FOREIGN PATENT DOCUMENTS

FR          2992355 A1    12/2013

OTHER PUBLICATIONS

Search Report issued in French Patent Application No. 1873857 dated Sep. 24, 2019.
(Continued)

*Primary Examiner* — Alain Chau
(74) *Attorney, Agent, or Firm* — Pearne & Gordon LLP

(57) ABSTRACT

A system and method for controlling an aircraft turbine engine. The control system includes: a nominal-mode processing chain including a global corrector designed to control a speed of rotation of the turbine engine by delivering a position setpoint for a fuel metering device, and a local corrector designed to control a position of the fuel metering device by delivering a nominal-mode control current, a degraded-mode processing chain including a direct corrector designed to control the speed of rotation of the turbine engine by delivering a degraded-mode control current, and
(Continued)

a mode management module designed to deliver, to the fuel metering device, the nominal-mode control current in the absence of failure of a position sensor measuring a position of the fuel metering device, and the degraded-mode control current in the case of failure of the position sensor.

14 Claims, 5 Drawing Sheets

(52) U.S. Cl.
CPC .... *F05D 2220/323* (2013.01); *F05D 2270/02* (2013.01); *F05D 2270/09* (2013.01); *F05D 2270/094* (2013.01)

(56) References Cited

U.S. PATENT DOCUMENTS

| | | | | |
|---|---|---|---|---|
| 7,836,676 B2* | 11/2010 | Futa, Jr. | ............... | F02C 7/232 60/734 |
| 8,549,863 B2* | 10/2013 | Brocard | ............... | F02C 9/28 60/779 |
| 9,032,786 B2* | 5/2015 | Masse | ............... | F02C 9/263 73/112.01 |
| 9,140,190 B2* | 9/2015 | Portolese | ............... | F02C 7/232 |
| 10,190,438 B2* | 1/2019 | Langford | ............... | F01D 21/02 |
| 10,260,425 B2* | 4/2019 | Crowley | ............... | F02C 7/232 |
| 10,330,023 B2* | 6/2019 | Selstad | ............... | G01F 1/34 |
| 10,451,509 B2* | 10/2019 | Mehrer | ............... | F02C 7/232 |
| 10,578,030 B2* | 3/2020 | Javelot | ............... | F02C 9/32 |
| 10,975,776 B2* | 4/2021 | Selstad | ............... | F02C 9/44 |
| 2007/0005219 A1 | 1/2007 | Muramatsu et al. | | |
| 2008/0163931 A1 | 7/2008 | Brocard et al. | | |
| 2010/0288364 A1* | 11/2010 | Singh | ............... | F16K 3/06 318/696 |
| 2011/0005296 A1* | 1/2011 | Muramatsu | ............... | G01D 3/022 73/1.37 |
| 2015/0152790 A1* | 6/2015 | Javelot | ............... | F02C 9/32 60/776 |
| 2016/0245188 A1* | 8/2016 | Selstad | ............... | F02C 9/263 |
| 2016/0298486 A1* | 10/2016 | Langford | ............... | F01D 21/02 |
| 2017/0292457 A1* | 10/2017 | Selstad | ............... | F02C 9/44 |
| 2021/0010430 A1* | 1/2021 | De Wergifosse | ............... | F02C 7/232 |

OTHER PUBLICATIONS

International Search Report for issued in Application No. PCT/FR2019/053101 dated Feb. 28, 2020.
Written Opinion for PCT/FR2019/053101 dated Feb. 28, 2020.

* cited by examiner

SYSTEM AND METHOD FOR CONTROLLING A SPEED OF ROTATION OF AN AIRCRAFT TURBINE ENGINE WITH FAULT MANAGEMENT

This is the National Stage of PCT international application PCT/FR2019/053101, filed on Dec. 17, 2019 entitled "SYSTEM AND METHOD FOR CONTROLLING A SPEED OF ROTATION OF AN AIRCRAFT TURBINE ENGINE WITH FAULT MANAGEMENT", which claims the priority of French Patent Application No. 1873857 filed Dec. 21, 2018, both of which are incorporated herein by reference in their entirety.

TECHNICAL FIELD

The invention relates to the field of controlling an aircraft turbine engine and, more specifically, the field of closed-loop controlling the rotational speed of the turbine engine by monitoring a fuel metering valve. It concerns a control system and method for an aircraft turbine engine, as well as a turbine engine equipped with the control system.

STATE OF THE PRIOR ART

The speed of rotation of an aircraft turbine engine is generally monitored by a fuel metering valve comprising a metering slide, whose position determines a volumetric flow rate of fuel injected into the combustion chamber and an actuator arranged to displace the metering slide depending on a control electric current. For most turbine engines, a closed-loop control of the rotational speed to a speed setpoint is carried out in order to obtain better performances of the turbine engine, in particular in terms of response to the speed setpoint. This closed-loop control can in particular be based on a double control loop, namely a global loop controlling the rotational speed of the turbine engine by calculating a position setpoint of the metering slide, and a local loop controlling the actuator depending on a position of the metering slide, measured by a position sensor. A drawback of this double control loop is that in case of failure of the position sensor, all rotational speed control can no longer be carried out. The loss of the position sensor then leads to a stop of the turbine engine. On a multi-engine aircraft, this implies a redistribution of the thrust and the electrical energy generation on the remaining turbine engines. On a single-engine aircraft, the loss of the position sensor is more critical since it implies not only a total loss of thrust but also a loss of the electrical energy generation. The position sensor being a critical element for the flight of the aircraft, it is normally doubled. Each position sensor then provides a position measurement to a corrector of the local loop, which performs the closed-loop control based on an average value of the two position measurements. Nevertheless, in the presence of two position sensors, a problem arises in the case of discrepancy between the position measurements. The corrector is not able to determine which of the position measurements is correct and should be used for the closed-loop control. Thus, even in case of failure of a single measurement sensor, the closed-loop control of the rotational speed of the turbine engine can be prevented. A fortiori, the closed-loop control is prevented in the case of loss of the two position sensors.

In view of the above, the aim of the invention is to provide a system for controlling an aircraft turbine engine allowing closed-loop controlling the rotational speed thereof to a setpoint even in the case of failure of a position sensor measuring a position of the metering slide. Another aim of the invention is to provide a control system guaranteeing an operation of the turbine engine within nominal operating ranges even in the absence of information on the position of the metering slide.

DISCLOSURE OF THE INVENTION

To this end, the invention is based on a closed-loop control of the rotational speed dispensing with the measurement of position of the metering slide. The actuator is driven directly depending on a deviation between the rotational speed setpoint and the rotational speed measurement.

More specifically, the invention relates to a control system for an aircraft turbine engine, the turbine engine comprising:
a combustion chamber,
a fuel metering valve including a metering slide, a position of which determines a volumetric flow rate of fuel injected into the combustion chamber and an actuator arranged to displace the metering slide depending on a control electric current,
a position sensor arranged to measure a position of the metering slide and deliver a position measurement,
a speed sensor arranged to measure a rotational speed of the turbine engine and deliver a rotational speed measurement, and
a monitoring unit arranged to deliver a rotational speed setpoint, to detect a failure of the position sensor and to deliver a failure signal in the case of detection of a failure of the position sensor.

According to the invention, the control system comprises:
a nominal-mode processing chain including:
a global corrector arranged to receive the rotational speed setpoint and the rotational speed measurement and determine a fuel mass flow rate setpoint depending on the rotational speed setpoint and the rotational speed measurement,
a conversion module arranged to convert the fuel mass flow rate setpoint into a position setpoint, and
a local corrector arranged to receive the position setpoint and the position measurement and determine a nominal-mode control electric current depending on the position setpoint and the position measurement,
a degraded-mode processing chain including a direct corrector arranged to receive the rotational speed setpoint and the rotational speed measurement and determine a degraded-mode control electric current depending on the rotational speed setpoint and the rotational speed measurement, and
a mode management module arranged to receive the failure signal, the nominal-mode control electric current and the degraded-mode control electric current, and to deliver, to the actuator of the fuel metering valve, the nominal-mode control electric current in the absence of reception of the failure signal and the degraded-mode control electric current in the case of reception of the failure signal.

Within the scope of the present invention, a flight parameter of the aircraft corresponds for example to a Mach number or to an altitude of the aircraft. An operating parameter of the turbine engine corresponds for example to a temperature within the turbine engine, for example a temperature of the exhaust gases or in the combustion chamber, or to a pressure within the turbine engine, for example a static pressure at the inlet of the combustion chamber.

According to a particular embodiment, the direct corrector is arranged to further receive one or more flight parameter(s) of the aircraft and/or one or more operating parameter(s) of the turbine engine, the degraded-mode control electric current being further determined depending on the flight parameters of the aircraft and/or the operating parameters of the turbine engine. Advantageously, the direct corrector can be arranged to receive a Mach number and an altitude of the aircraft and determine the degraded-mode control electric current depending on these flight parameters.

The direct corrector is for example a proportional corrector, an integral corrector, a derivative corrector or any combination of these correctors. In particular, the direct corrector may include a corrector of the proportional-integral type. When the direct corrector receives a flight parameter of the aircraft and/or an operating parameter of the turbine engine, the gain of the proportional corrector, the integration constant of the proportional corrector and/or the derivative constant of the derivative corrector can be variables depending on these parameters.

The degraded-mode processing chain can also be arranged so as to integrate a protection module arranged to limit the operation of the turbine engine in nominal operating ranges, which correspond to a closed-loop control of the turbine engine by the nominal-mode processing chain, or even in reduced operating ranges.

In particular, in a first embodiment, the degraded-mode processing chain further includes a gradient limiter arranged to receive the rotational speed setpoint and determine an acceleration-limited speed setpoint. The acceleration-limited speed setpoint is determined so as to limit a speed of evolution of the rotational speed setpoint and is used by the direct corrector instead of the rotational speed setpoint. In practice, the acceleration-limited speed setpoint is determined so as to follow the rotational speed setpoint with an evolution speed which is less than or equal to a predetermined maximum acceleration threshold.

The gradient limiter can further be arranged to receive one or more flight parameter(s) of the aircraft and/or one or more operating parameter(s) of the turbine engine, the predetermined maximum acceleration threshold then being variable depending on the flight parameters and/or the operating parameters of the turbine engine.

In a second embodiment, the degraded-mode processing chain further includes a limiting circuit arranged to receive the rotational speed setpoint, the rotational speed measurement and an operating parameter of the turbine engine, and determine a limited speed setpoint, the limited speed setpoint being determined by calculating a difference between the operating parameter and a predetermined minimum threshold parameter or between the operating parameter and a predetermined maximum threshold parameter, by multiplying said difference by a coefficient relating to the operating parameter, by adding the rotational speed measurement to the result of the multiplication, and by taking, as limited speed setpoint, the maximum between the result of the addition and the rotational speed setpoint when the difference is calculated relative to a minimum threshold parameter, and the minimum between the result of the addition and the rotational speed setpoint when the difference is calculated relative to a maximum threshold parameter.

In particular, the limiting circuit can be arranged to receive, as an operating parameter, a pressure measurement of the turbine engine, for example a measurement of the static pressure at the inlet of the combustion chamber, a difference being calculated between the pressure measurement and a predetermined minimum pressure. Alternatively, the limiting circuit can be arranged to receive, as an operating parameter, a temperature measurement of the turbine engine, for example a measurement of the temperature of the exhaust gases, a difference being calculated between the temperature measurement and a predetermined maximum temperature.

The limiting circuit can be arranged to receive several operating parameters of the turbine engine, each operating parameter being compared to a minimum or maximum threshold parameter, as previously indicated. In this case, the limited speed setpoint is determined as being the maximum of the different minima and maxima determined for the operating parameters of the turbine engine.

The invention also relates to a turbine engine for an aircraft comprising:
a combustion chamber,
a fuel metering valve including a metering slide, a position of which determines a volumetric flow rate of fuel injected into the combustion chamber and an actuator arranged to displace the metering slide depending on a control electric current,
a position sensor arranged to measure a position of the metering slide and deliver a position measurement,
a speed sensor arranged to measure a rotational speed of the turbine engine and deliver a rotational speed measurement,
a monitoring unit arranged to deliver a rotational speed setpoint, to detect a failure of the position sensor and to deliver a failure signal in the case of detection of a failure of the position sensor, and
a control system as previously described.

According to a particular embodiment, the position sensor comprises a first sensitive element and a second sensitive element, the first sensitive element being arranged to measure a position of the metering slide and deliver a first position measurement, the second sensitive element being arranged to measure a position of the metering slide and deliver a second position measurement, the monitoring unit being arranged to detect a failure of the position sensor in the case of a deviation between the first position measurement and the second position measurement which is greater than a predetermined threshold or in the absence of reception of the first position measurement and of the second position measurement.

Finally, the invention relates to a control method for an aircraft turbine engine, the turbine engine comprising:
a combustion chamber,
a fuel metering valve including a metering slide, a position of which determines a volumetric flow rate of fuel injected into the combustion chamber and an actuator arranged to displace the metering slide depending on a control electric current,
a position sensor arranged to measure a position of the metering slide and deliver a position measurement,
a speed sensor arranged to measure a rotational speed of the turbine engine and deliver a rotational speed measurement, and
a monitoring unit arranged to deliver a rotational speed setpoint, to detect a failure of the position sensor and to deliver a failure signal in the case of detection of a failure of the position sensor.

According to the invention, the control method comprises the steps consisting of in:
supervising a failure of the position sensor,
in the absence of failure of the position sensor,
determining a fuel mass flow rate setpoint depending on the rotational speed setpoint and the rotational speed measurement, converting the fuel mass flow rate setpoint into a position setpoint, determining a nominal-mode control electric current depending on the position setpoint and the position measurement, and delivering, to the actuator of the fuel metering valve, the nominal-mode control electric current, in the case of a failure of the position sensor, determining a degraded-mode control electric current depending on the rotational speed setpoint and the rotational speed measurement, and delivering, to the actuator of the fuel metering valve, the degraded-mode control electric current.

BRIEF DESCRIPTION OF THE DRAWINGS

Other features, details and advantages of the invention will become apparent on reading the following description, given only by way of example and with reference to the appended drawings in which.

DETAILED DESCRIPTION

Figure 1:
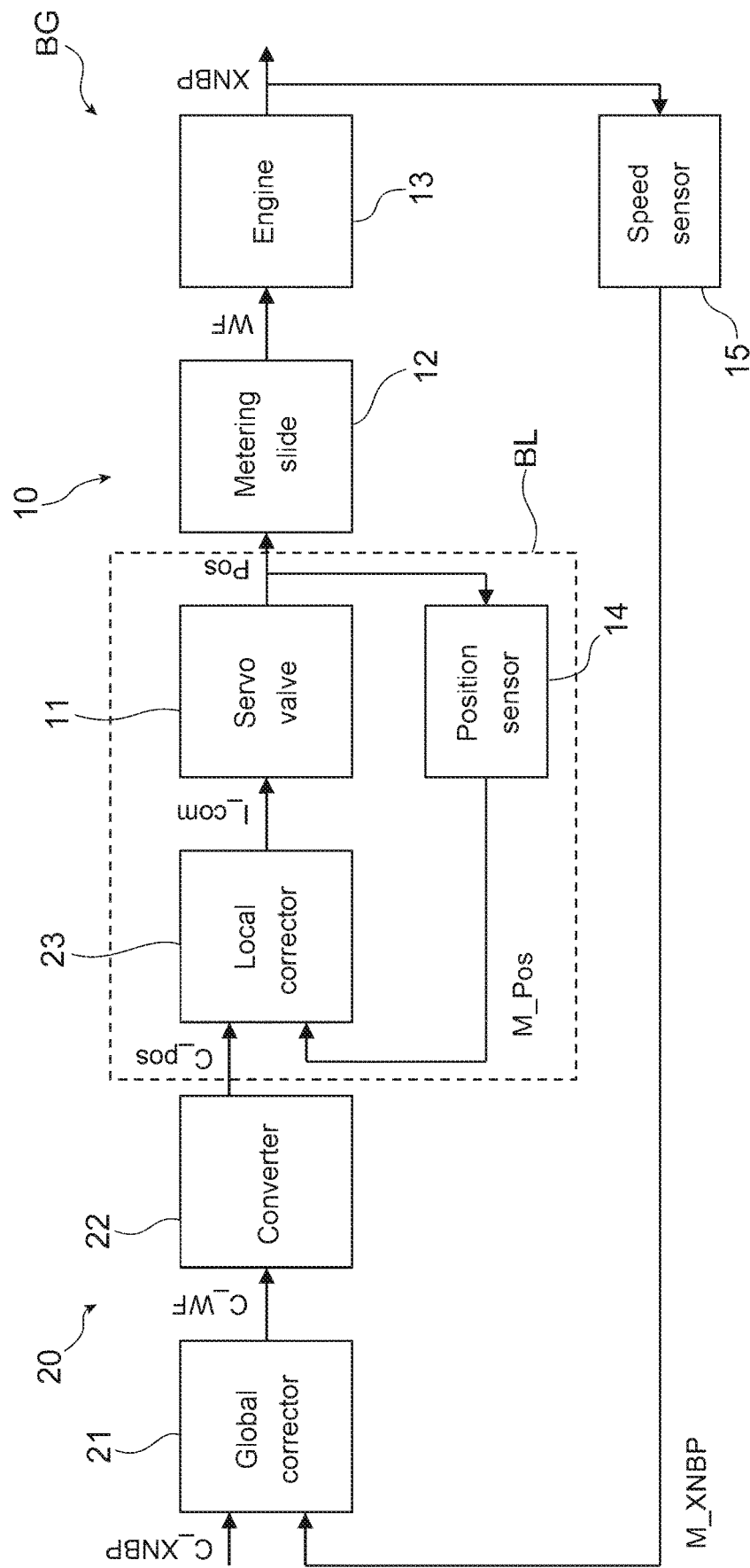
FIG. 1 represents, in block diagram form, an example of a turbine engine of an aircraft and a control system with double control loop for the turbine engine.

FIG. 1 represents, in block diagram form, an example of a turbine engine of an aircraft and of a control system for the turbine engine based on a double control loop. The turbine engine 10 comprises in particular a servo valve 11, a metering slide 12, a combustion chamber and a set of rotating elements, generally designated by the term "engine" 13, a position sensor 14 and a speed sensor 15. The servo valve 11 and the metering slide 12 form a fuel metering valve. The metering slide 12 is arranged to be able to be displaced into different positions by the servo valve 11, each position, denoted "Pos" corresponding to a volumetric flow rate of fuel, denoted "WF", which is injected into the combustion chamber. The combustion of this volume of fuel drives in rotation rotating elements of the turbine engine, in particular a compressor and a turbine. For a double-body turbine engine, the rotating elements comprise a low-pressure body and a high-pressure body, each body comprising a compressor, a turbine and a connecting shaft between the compressor and the turbine. The rotational speed of one of the rotating elements is measured by the speed sensor 15. For the remainder of the description, it is considered that the speed sensor 15 measures the rotational speed of the low pressure body XNBP, the measurement being denoted "M_XNBP". Moreover, the position Pos of the metering slide 12 is measured by the position sensor 14, the position measurement being denoted "M_Pos". The position sensor 14 may include two sensitive elements, each sensitive element being arranged to measure the position of the metering slide 12 and deliver a position measurement. The position sensor 14 is for example a sensor of the "Linear Variable Differential Transformer" LVDT type.

The control system 20 comprises a global corrector 21, a converter 22 and a local corrector 23. The global corrector 21 receives the rotational speed measurement M_XNBP and a speed setpoint, denoted "C_XNBP", provided by a unit for monitoring the aircraft. This setpoint is for example determined depending on the thrust required by a pilot of the aircraft or an automatic pilot. Depending on the speed setpoint C_XNBP and the rotational speed measurement M_XNBP, the global corrector 21 determines a fuel mass flow rate setpoint, denoted "C_WF". The converter 22 is arranged to receive this setpoint C_WF and determine an associated position setpoint C_Pos for the metering slide 12. The converter 22 can in particular determine the position setpoint C_Pos depending on one or more parameter(s), for example a temperature of the fuel upstream of the metering slide 12. The position setpoint C_Pos is delivered to the local corrector 23, which also receives the position measurement M_Pos. The local corrector 23 is arranged to determine a control electric current I_com depending on the position setpoint C_Pos and the position measurement M_Pos. When the position sensor 14 provides several position measurements, the local corrector 23 considers for example an average value of the position measurements. The control electric current I_com is delivered to the servo valve 11, such that the actuation thereof displaces the metering slide into the desired position. The global corrector 21 and the local corrector 23 are for example PID (proportional, integral, derivative) correctors.

The control system 20 thus includes a double control loop, namely a local loop BL, formed by the local corrector 23, the servo valve 11 and the position sensor 14, and a global loop BG, formed by the global corrector 21, the converter 22, the local corrector 23, the servo valve 11, the position sensor 14, the metering slide 12, the engine 13 and the speed sensor 15. It emerges from this arrangement that in the case of absence of reception of the position measurement M_Pos by the local corrector 23, or of a significant deviation between the position measurements by several sensitive elements, the local loop BL is no longer operational, which also leads to prevent the operation of the global loop BG. In the absence of any closed-loop control, the turbine engine is automatically or manually stopped.

In order to avoid a loss of control of the turbine engine, and therefore of the turbine engine itself, the invention proposes a control system comprising, in addition to the double control loop which is described above, a loop for controlling the rotational speed of the turbine engine which does not take into account the position measurement M_Pos and which can be used in the case of unavailability or failure of this position measurement M_Pos. This control loop is called a "degraded-mode failure loop".

Figure 2:
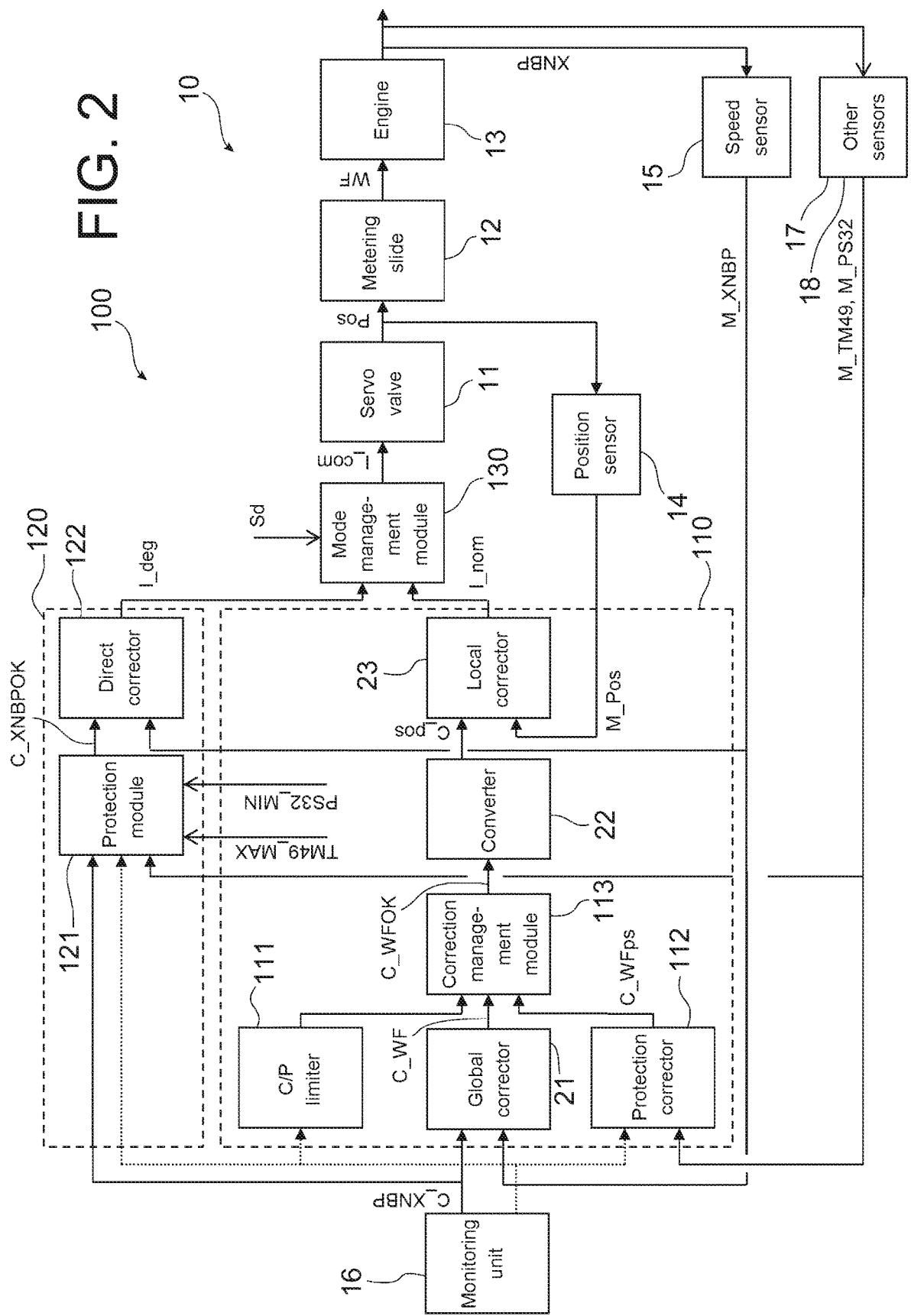
FIG. 2 represents, in block diagram form, an example of a turbine engine of an aircraft and of a control system according to the invention for the turbine engine, said control system comprising a nominal-mode processing chain and a degraded-mode processing chain.

FIG. 2 represents, in block diagram form, an example of a turbine engine of an aircraft and a control system according to the invention for the turbine engine. The turbine engine 10 comprises, like the turbine engine of FIG. 1, a servo valve 11, a metering slide 12, an engine 13 including a combustion chamber and rotating elements, a position sensor 14 and a speed sensor 15. Furthermore, the turbine engine 10 comprises a monitoring unit 16, a temperature sensor 17 arranged to measure a temperature within the turbine engine and a pressure sensor 18 arranged to measure a pressure within the turbine engine. The monitoring unit 16 is arranged to provide the speed setpoint C_XNBP and various flight and/or operating parameters of the turbine engine 10, as indicated hereinafter. In this exemplary embodiment, the temperature sensor 17 is arranged to determine a measurement of the temperature of the exhaust gases M_TM49 and the pressure sensor 18 is arranged to determine a measurement of the static pressure at the inlet of the combustion chamber M_PS32. The temperature sensor 17 could nevertheless measure any other temperature of the turbine engine necessary for the regulation thereof. The control system 100 comprises a nominal-mode processing chain 110, a degraded-mode processing chain 120 and a mode management module 130.

The nominal-mode processing chain 110 includes, in a manner identical to the control system 20 of FIG. 1, a global corrector 21, a converter 22 and a local corrector 23. In addition, it includes a C/P limiter 111, a protection corrector 112 and a correction management module 113. The C/P limiter 111 receives, from the monitoring unit 16, flight parameters and operating parameters of the turbine engine, and determines minimum and maximum limits of fuel flow rate depending on these parameters. The flight parameters comprise, for example, a Mach number and an altitude of the aircraft and the operating parameters of the turbine engine comprise, for example, a measurement of the temperature of the exhaust gases M_TM49 and a measurement of the static pressure at the inlet of the combustion chamber M_PS32. The protection corrector 112 also receives flight parameters and operating parameters of the turbine engine. From these parameters, the protection corrector 112 calculates a fuel mass flow rate setpoint C_WFps allowing meeting the threshold parameters, for example a maximum exhaust gas temperature TM49_MAX and a minimum static pressure at the inlet of the combustion chamber PS32_MIN. Of course, other parameters can be taken into account by the protection corrector 112. In practice, the protection corrector 112 can include an individual protection corrector for each parameter to be supervised. The global corrector 21 determines the fuel mass flow rate setpoint C_WF depending on the speed setpoint C_XNBP and the rotational speed measurement M_XNBP. The fuel mass flow rate setpoints C_WF and C_WFps, and the minimum and maximum limits of fuel flow rate are provided to the correction management module 113, which checks that the fuel mass flow rate setpoint C_WF complies with the minimum and maximum limits of fuel flow rate and with the setpoint C_WFps, and provides at the output a thresholded fuel mass flow rate setpoint C_WFOK. Said setpoint C_WFOK is converted by the converter 22 into a position setpoint C_Pos for the metering slide 12. In a similar manner to the control system of FIG. 1, the position setpoint C_Pos is provided to the local corrector 23 in order to carry out a closed-loop control on the position of the metering slide 12. The local corrector 23 determines a nominal-mode control electric current I_nom which corresponds, in the absence of action of the C/P limiter 111 and of the protection corrector 112, to the control electric current I_com of the control system 20.

The degraded-mode processing chain 120 includes a protection module 121 and a direct corrector 122. The protection module 121 is arranged to fulfil functions which are similar to those of the C/P limiter 111 and of the protection corrector 112. It receives flight parameters and operating parameters of the turbine engine 10 from the monitoring unit 16, the temperature sensor 17 and the pressure sensor 18. The protection module 121 further receives the speed setpoint C_XNBP and determines a safe speed setpoint C_XNBPOK. An exemplary embodiment of the protection module 121 will be described in detail with reference to FIG. 4. The direct corrector 122 receives the safe speed setpoint C_XNBPOK and the rotational speed measurement M_XNBP, and determines a degraded-mode control electric current I_deg depending on this safe speed setpoint C_XNBPOK and this rotational speed measurement M_XNBP. The direct corrector 122 is for example a PI (proportional, integral) corrector.

The mode management module 130 receives the nominal-mode control electric current I_nom and the degraded-mode control electric current I_deg and delivers a control electric current I_com for the servo valve 11. The mode management module 130 is arranged to deliver, as control electric current I_com, the nominal-mode control electric current I_nom in the absence of a failure in the measurement of the position of the metering slide 12, and the degraded-mode control electric current I_deg in the case of a failure. To this end, the mode management module can receive a failure signal Sd generated in the case of a failure of the position sensor 14. The failure signal Sd is for example generated by the monitoring unit 16. Alternatively, the mode management module 130 can receive the position measurement of each of the sensitive elements from the position sensor 14 and deduce a failure therefrom, in particular in the case of a deviation between the two position measurements. Thus, depending on the control electric current selected by the mode management module, the control system 100 performs a closed-loop control of the rotational speed XNBP either using the nominal-mode processing chain 110, or using the degraded-mode processing chain 120. In this case, when the nominal-mode control electric current I_nom is selected, a local closed-loop control is performed through the local corrector 23, the servo valve 11 and the position sensor 14, and a global closed-loop control is performed concomitantly by the global corrector 21, the converter 22, the local corrector 23, the servo valve 11, the metering slide 12, the engine 13 and the speed sensor 15.

Figure 3:
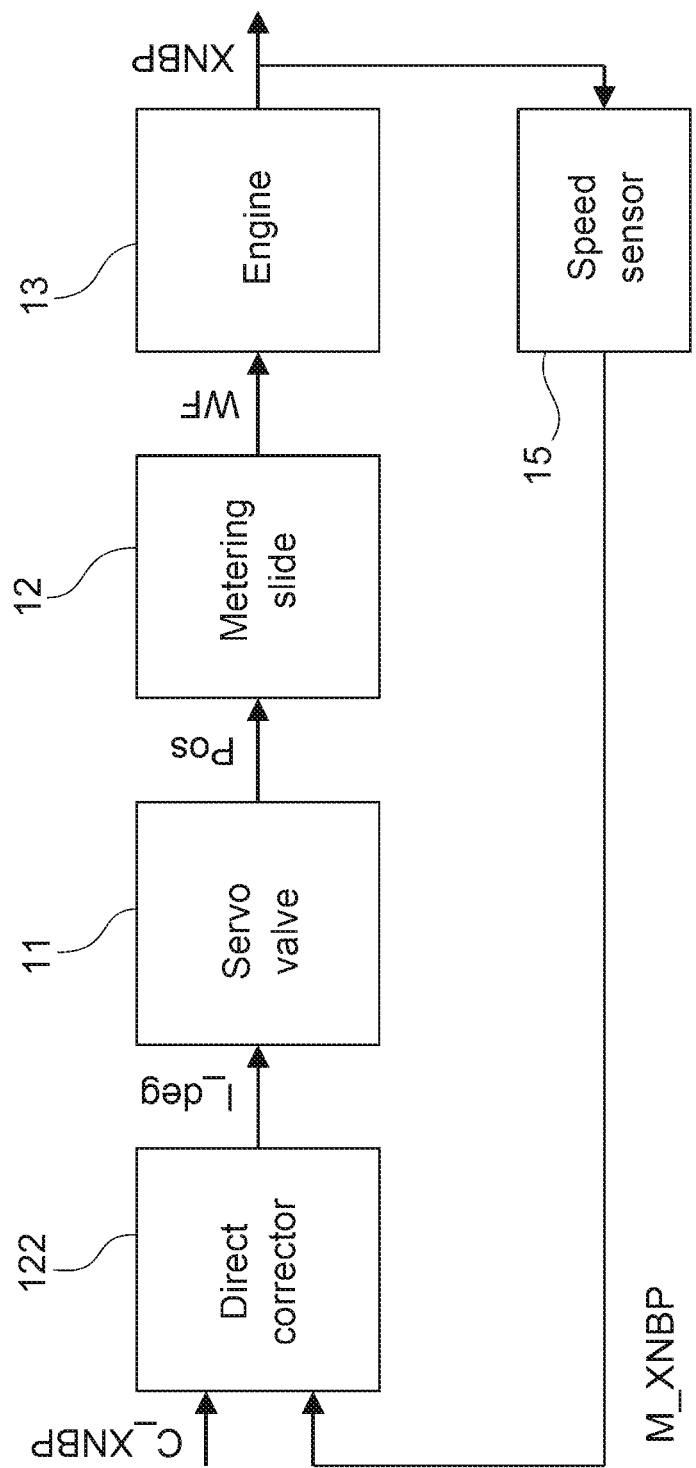
FIG. 3 represents a closed-loop control carried out using the degraded-mode processing chain.

FIG. 3 represents the closed-loop control carried out using the degraded-mode processing chain 120 when the degraded-mode control electric current I_deg is selected. A single closed-loop control loop is formed by the direct corrector 122, the servo valve 11, the metering slide 12, the engine 13 and the speed sensor 15. The closed-loop control can be qualified as "direct" insofar as it does not use the position measurement M_Pos of the metering slide 12. It should be noted that the direct corrector 122 can directly receive the speed setpoint C_XNBP, as represented in FIG. 3, in the absence of a protection module 121.

Figure 4:
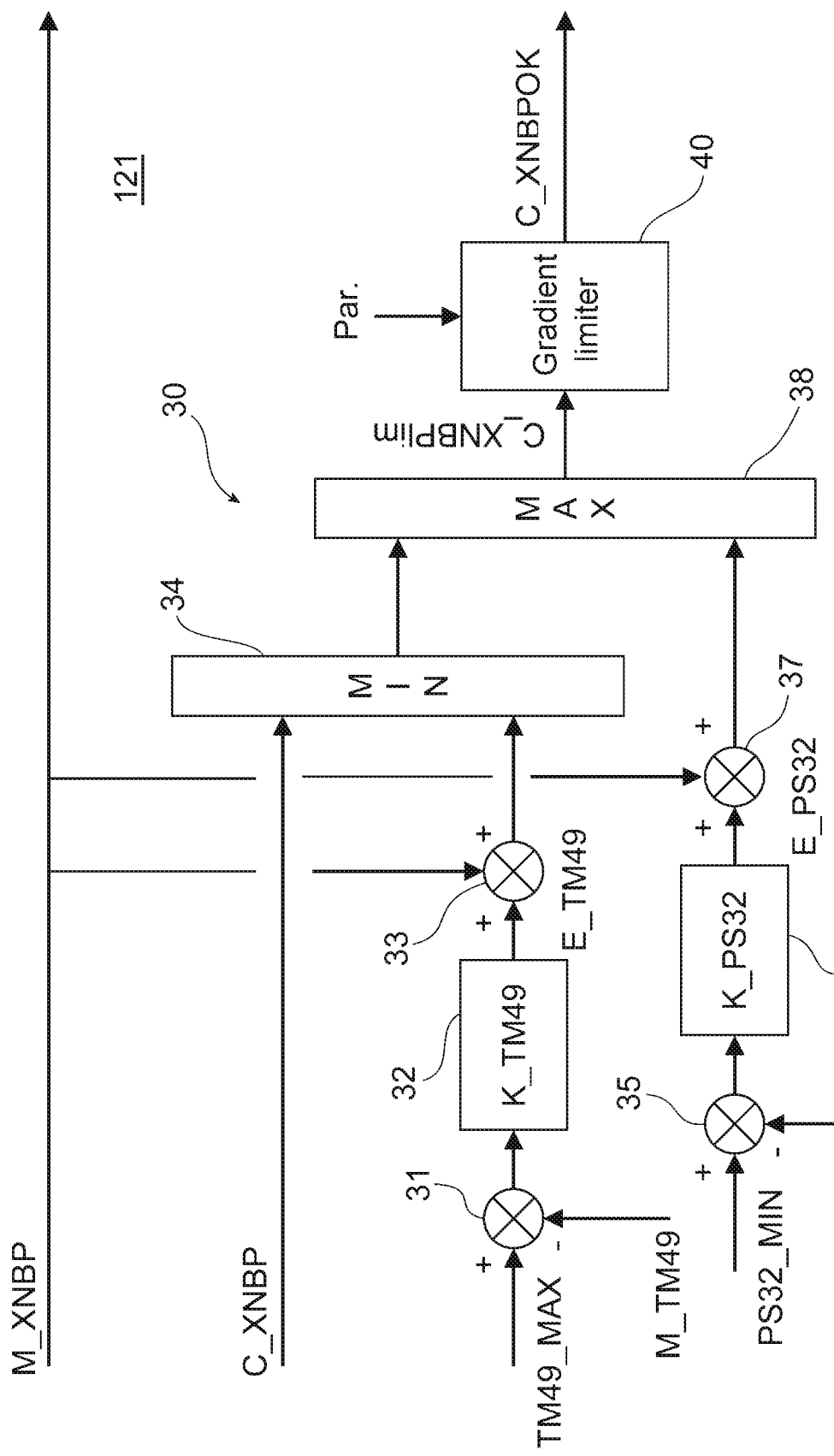
FIG. 4 represents a protection module equipping the degraded-mode processing chain.

FIG. 4 represents the protection module 121 of the degraded-mode processing chain 120. The protection module 121 comprises a limiting circuit 30 and a gradient limiter 40. The limiting circuit 30 comprises a first subtracter 31, a first amplifier 32, a first adder 33, a MIN operator 34, a second subtracter 35, a second amplifier 36, a second adder 37 and a MAX operator 38. It is arranged to receive the rotational speed setpoint C_XNBP, the rotational speed measurement M_XNBP, the measurement of the temperature of the exhaust gases M_TM49 and the measurement of the static pressure at the inlet of the combustion chamber M_PS32, and to deliver a limited speed setpoint C_XNBPlim. The subtracter 31 subtracts the measurement of the exhaust gas temperature M_TM49 from a maximum temperature TM49_MAX (TM49_MAX−M_TM49); the amplifier 32 calculates a value E_TM49 by multiplying the result of the subtraction by a temperature coefficient K_TM49 (E_TM49=K_TM49×(TM49_MAX−M_TM49)); the adder 33 adds the result of this multiplication to the rotational speed measurement M_XNBP: K_TM49×(TM49_MAX−M_TM49)+M_XNBP; and the MIN operator 34 compares the result of this addition with the rotational speed setpoint C_XNBP and retains the minimum value. In parallel, the subtracter 35 subtracts the pressure measurement M_PS32 from a minimum pressure PS32_MIN (PS32_MIN−M_PS32); the amplifier 36 calculates a value E_PS32 by multiplying the result of the subtraction by a pressure coefficient K_PS32 (E_PS32=K_PS32× (PS32_MIN−M_PS32)); the adder 37 adds the result of this multiplication to the rotational speed measurement M_XNBP (K_PS32×(PS32_MIN−M_PS32)+M_XNBP); and the MAX operator 38 compares the result of this addition to the minimum value retained by the MIN operator 34 and retains the maximum value. This maximum value corresponds to the limited speed setpoint C_XNBPlim.

The limiting circuit 30 allows preventing the turbine engine 10 from operating with an exhaust gas temperature which is greater than the maximum temperature TM49_MAX and/or with a static pressure at the inlet of the combustion chamber which is lower than the minimum pressure PS32_MIN. Indeed, when the temperature measurement M_TM49 approaches the maximum temperature TM49_MAX, the sum of the value E_TM49 and the rotational speed measurement M_XNBP (E_TM49+M_XNBP) becomes less than the rotational speed setpoint C_XNBP. It is then this sum which is used as the limited speed setpoint C_XNBPlim instead of the rotational speed setpoint C_XNBP. It can be noticed that if the temperature measurement M_TM49 is equal to the maximum temperature TM49_MAX, the limited speed setpoint C_XNBPlim is equal to the rotational speed measurement M_XNBP. Likewise, when the pressure measurement M_PS32 approaches the minimum pressure PS32_MIN, the sum of the value E_PS32 and the rotational speed measurement M_XNBP becomes greater than the rotational speed setpoint C_XNBP. It is then this sum which is used as a limited speed setpoint C_XNBPlim instead of the rotational speed setpoint C_XNBP. In this exemplary embodiment, only two operators 34, 38 are used. Nevertheless, the result of the addition at the output of the adder 37 could be compared to the rotational speed setpoint C_XNBP by a first MAX operator, a second MAX operator comparing the values from this first MAX operator and from the MIN operator 34. Moreover, more than two parameters can be taken into account to determine the limited speed setpoint C_XNBPlim. In this case, each of these parameters is compared to a minimum or maximum threshold parameter, as described for the pressure PS32 and the temperature TM49. The setpoint C_XNBPlim then results from the maximum of the values from the different operators each associated to a parameter.

The gradient limiter 40 receives the limited speed setpoint C_XNBPlim and determines an acceleration-limited speed setpoint, corresponding to the safe speed setpoint C_XNBPOK. This acceleration-limited speed setpoint C_XNBPOK is determined so as to follow the limited speed setpoint C_XNBPlim with an evolution speed which is less than or equal to a predetermined maximum acceleration threshold. The gradient limiter 40 thus allows slowing down the dynamics of the turbine engine and avoiding generating fuel flow rate to pressure ratios outside the nominal operating ranges. The gradient limiter 40 can receive one or more flight parameter(s) of the aircraft and/or one or more operating parameter(s) of the turbine engine, and adapt the maximum acceleration threshold as depending on these parameters. In particular, the maximum acceleration threshold can be variable depending on the Mach number and the altitude of the aircraft, as well as the static pressure upstream of the combustion chamber PS32.

The temperature coefficient K_TM49 can be determined by comparing, using a turbine engine model, the effects of an increase in the rotational speed XNBP on the exhaust gas temperature TM49. The pressure coefficient K_PS32 can be analogously determined. The predetermined maximum acceleration threshold of the gradient limiter 40 can be determined using a simulation of a turbine engine model regulated using the nominal-mode processing chain. It may correspond to the acceleration from which the fuel flow rate exceeds the maximum limit of the C/P limiter 111.

The control system 100 can have a purely hardware architecture, or a software architecture capable of executing a computer program. This is, for example, a field programmable gate array (FPGA), a processor, a microprocessor, or a microcontroller. Moreover, the functional configuration of the elements of the control system 100 in no way limits the hardware configuration of these elements. Thus, by way of example, two elements presented as being distinct can in practice be formed by the same electrical or electronic component, or the functions thereof which are executed by the same processor.

Figure 5:
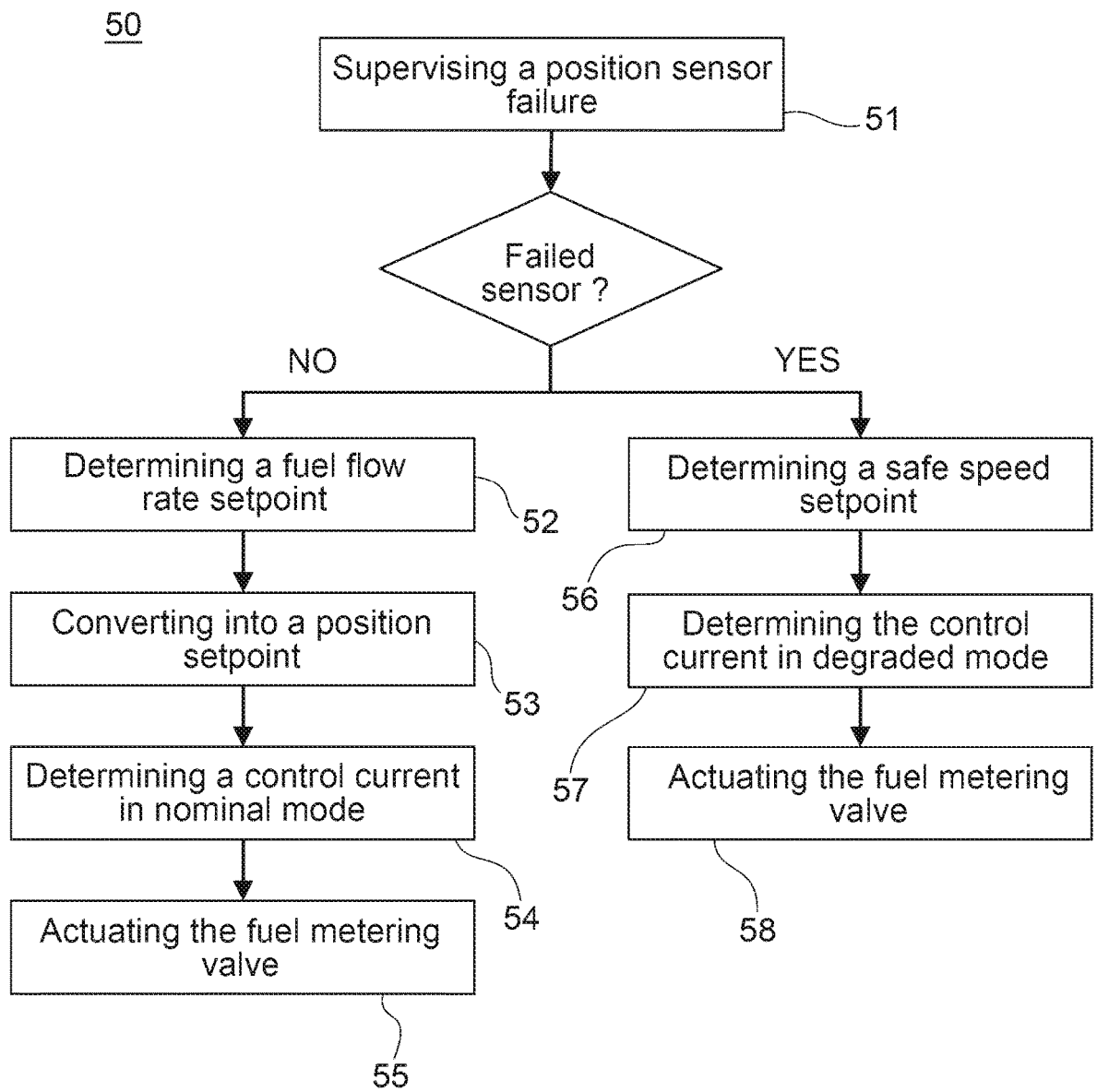
FIG. 5 represents an example of a control method according to the invention.

FIG. 5 represents an example of a control method implementing the turbine engine and the control system of FIG. 2. The method 50 comprises a supervising step 51 in which a failure of the position sensor 14 is supervised. This supervising step 51 is preferably performed continuously or at regular time intervals. It consists for example in determining an absence of position measurement or a deviation between two position measurements greater than a predetermined threshold. In the absence of failure of the position sensor 14, the method continues to a step 52 of determining a fuel flow rate setpoint. In this step 52, a fuel mass flow rate setpoint C_WF is determined depending on the rotational speed setpoint C_XNBP and the rotational speed measurement M_XNBP. Step 52 is carried out by the global corrector 21, the C/P limiter 111, the protection corrector 112 and the correction management module 113. Then, in a conversion step 53, the fuel mass flow rate setpoint C_WF is converted into a position setpoint C_Pos. This step 53 is carried out by the converter 22. In a step 54 of determining a nominal-mode control current, a nominal-mode control electric current I_nom is determined depending on the position setpoint C_Pos and the position measurement M_Pos. In an actuation step 55, the nominal-mode control electric current I_nom is delivered to the servo valve 11 so as to displace the metering slide 12 into the desired position. When, during the supervising step 51, a failure of the position sensor 14 is detected, the method switches to a step 56 of determining a safe speed setpoint. This step 56 is carried out by the protection module 121. It consists in determining the safe speed setpoint C_XNBPOK from the rotational speed setpoint C_XNBP, flight parameters and operating parameters of the turbine engine. The control method then includes a step 57 of determining a degraded-mode control current. In this step 57, carried out by the degraded-mode processing chain 120, a degraded-mode control electric current I_deg is determined depending on the safe speed setpoint C_XNBPOK and the rotational speed measurement M_XNBP. Then, in an actuation step 58, the degraded-mode control electric current I_deg is delivered to the servo valve 11 so as to displace the metering slide 12 into the desired position.

What is claimed is:

1. A control system for an aircraft turbine engine, the turbine engine comprising:
   a combustion chamber,
   a fuel metering valve including a metering slide, a position of which determines a volumetric flow rate of fuel injected into the combustion chamber and an actuator arranged to displace the metering slide depending on a control electric current, a position sensor arranged to measure a position of the metering slide and deliver a position measurement, a speed sensor arranged to measure a rotational speed of the turbine engine and deliver a rotational speed measurement, and a monitoring unit arranged to deliver a rotational speed setpoint, to detect a failure of the position sensor and to deliver a failure signal in the case of detection of a failure of the position sensor, the control system comprising a non-transitory computer-readable medium storing a software architecture thereon, and a processor configured to execute the software architecture, the software architecture including:

a nominal-mode processing chain including:

a global corrector arranged to receive the rotational speed setpoint and the rotational speed measurement and determine a fuel mass flow rate setpoint depending on the rotational speed setpoint and the rotational speed measurement, a converter arranged to convert the fuel mass flow rate setpoint into a position setpoint, and a local corrector arranged to receive the position setpoint and the position measurement and determine a nominal-mode control electric current depending on the position setpoint and the position measurement, a degraded-mode processing chain including a direct corrector arranged to receive the rotational speed setpoint and the rotational speed measurement and determine a degraded-mode control electric current depending on the rotational speed setpoint and the rotational speed measurement, and a mode management module arranged to receive the failure signal (Sd), the nominal-mode control electric current and the degraded-mode control electric current, and to deliver, to the actuator of the fuel metering valve, the nominal-mode control electric current in the absence of reception of the failure signal and the degraded-mode control electric current in the case of reception of the failure signal.

2. The control system according to claim 1, wherein the direct corrector is arranged to further receive one or more flight parameter(s) of the aircraft and/or one or more operating parameter(s) of the turbine engine, the degraded-mode control electric current being further determined depending on the flight parameters of the aircraft and/or the operating parameters of the turbine engine.

3. The control system according to claim 1, wherein the degraded-mode processing chain further includes a gradient limiter arranged to receive the rotational speed setpoint and determine an acceleration-limited speed setpoint, the acceleration-limited speed setpoint being determined so as to limit a speed of evolution of the rotational speed setpoint, the acceleration-limited speed setpoint being used by the direct corrector instead of the rotational speed setpoint.

4. The control system according to claim 3, wherein the gradient limiter is further arranged to receive one or more flight parameter(s) of the aircraft and/or one or more operating parameter(s) of the turbine engine, the predetermined maximum acceleration threshold being variable depending on the flight parameters and/or the operating parameters of the turbine engine.

5. The control system according to claim 1, wherein the degraded-mode processing chain further includes a limiting circuit arranged to receive the rotational speed setpoint, the rotational speed measurement and an operating parameter of the turbine engine, and determine a limited speed setpoint, the limited speed setpoint being determined by calculating a difference between the operating parameter and a predetermined minimum threshold parameter or between the operating parameter and a predetermined maximum threshold parameter, by multiplying said difference by a coefficient relating to the operating parameter, by adding the rotational speed measurement to the result of the multiplication, and by taking, as limited speed setpoint, the maximum between the result of the addition and the rotational speed setpoint when the difference is calculated relative to a minimum threshold parameter, and the minimum between the result of the addition and the rotational speed setpoint when the difference is calculated relative to a maximum threshold parameter.

6. The control system according to claim 5, wherein the limiting circuit is arranged to receive, as an operating parameter, a pressure measurement of the turbine engine, a difference being calculated between the pressure measurement and a predetermined minimum pressure, and/or the limiting circuit is arranged to receive, as an operating parameter, a temperature measurement of the turbine engine, a difference being calculated between the temperature measurement and a predetermined maximum temperature.

7. A turbine engine for an aircraft comprising:
a combustion chamber,
a fuel metering valve including a metering slide, a position of which determines a volumetric flow rate of fuel injected into the combustion chamber and an actuator arranged to displace the metering slide depending on a control electric current,
a position sensor arranged to measure a position of the metering slide and deliver a position measurement,
a speed sensor arranged to measure a rotational speed of the turbine engine and deliver a rotational speed measurement,
a monitoring unit arranged to deliver a rotational speed setpoint, to detect a failure of the position sensor and to deliver a failure signal in the case of detection of a failure of the position sensor, and
the control system according to claim 1.

8. The turbine engine according to claim 7, wherein the position sensor comprises a first sensitive element and a second sensitive element, the first sensitive element being arranged to measure a position of the metering slide and deliver a first position measurement, the second sensitive element being arranged to measure a position of the metering slide and deliver a second position measurement, the monitoring unit being arranged to detect a failure of the position sensor in the case of a deviation between the first position measurement and the second position measurement which is greater than a predetermined threshold or in the absence of reception of the first position measurement and of the second position measurement.

9. A control method for an aircraft turbine engine, the turbine engine comprising:
a combustion chamber,
a fuel metering valve including a metering slide, a position of which determines a volumetric flow rate of fuel injected into the combustion chamber and an actuator arranged to displace the metering slide depending on a control electric current,
a position sensor arranged to measure a position of the metering slide and deliver a position measurement, a speed sensor arranged to measure a rotational speed of the turbine engine and deliver a rotational speed measurement, and a monitoring unit arranged to deliver a rotational speed setpoint, to detect a failure of the position sensor and to deliver a failure signal in the case of detection of a failure of the position sensor, the control method comprising the steps consisting of:

supervising a failure of the position sensor, in the absence of failure of the position sensor, determining a fuel mass flow rate setpoint depending on the rotational speed setpoint and the rotational speed measurement, converting the fuel mass flow rate setpoint into a position setpoint, determining a nominal-mode control electric current depending on the position setpoint and the position measurement, and delivering, to the actuator of the fuel metering valve, the nominal-mode control electric current, in the case of a failure of the position sensor, determining a degraded-mode control electric current depending on the rotational speed setpoint and the rotational speed measurement, and delivering, to the actuator of the fuel metering valve, the degraded-mode control electric current.

10. A control system for an aircraft turbine engine, the turbine engine comprising:

a combustion chamber, a fuel metering valve including a metering slide, a position of which determines a volumetric flow rate of fuel injected into the combustion chamber and an actuator arranged to displace the metering slide depending on a control electric current, a position sensor arranged to measure a position of the metering slide and deliver a position measurement, a speed sensor arranged to measure a rotational speed of the turbine engine and deliver a rotational speed measurement, and a monitoring unit arranged to deliver a rotational speed setpoint, to detect a failure of the position sensor and to deliver a failure signal in the case of detection of a failure of the position sensor, the control system comprising a hardware architecture which includes:

a nominal-mode processing chain including:

a global corrector arranged to receive the rotational speed setpoint and the rotational speed measurement and determine a fuel mass flow rate setpoint depending on the rotational speed setpoint and the rotational speed measurement, a converter arranged to convert the fuel mass flow rate setpoint into a position setpoint, and a local corrector arranged to receive the position setpoint and the position measurement and determine a nominal-mode control electric current depending on the position setpoint and the position measurement, a degraded-mode processing chain including a direct corrector arranged to receive the rotational speed setpoint and the rotational speed measurement and determine a degraded-mode control electric current depending on the rotational speed setpoint and the rotational speed measurement, and a mode management module arranged to receive the failure signal, the nominal-mode control electric current and the degraded-mode control electric current, and to deliver, to the actuator of the fuel metering valve, the nominal-mode control electric current in the absence of reception of the failure signal and the degraded-mode control electric current in the case of reception of the failure signal;

the control system being configured to execute the processing chains of the hardware architecture.

11. The control system according to claim 10, wherein the direct corrector is arranged to further receive one or more flight parameter(s) of the aircraft and/or one or more operating parameter(s) of the turbine engine, the degraded-mode control electric current being further determined depending on the flight parameters of the aircraft and/or the operating parameters of the turbine engine.

12. The control system according to claim 10, wherein the degraded-mode processing chain further includes a gradient limiter arranged to receive the rotational speed setpoint and determine an acceleration-limited speed setpoint, the acceleration-limited speed setpoint being determined so as to limit a speed of evolution of the rotational speed setpoint, the acceleration-limited speed setpoint being used by the direct corrector instead of the rotational speed setpoint.

13. The control system according to claim 10, wherein the degraded-mode processing chain further includes a limiting circuit arranged to receive the rotational speed setpoint, the rotational speed measurement and an operating parameter of the turbine engine, and determine a limited speed setpoint, the limited speed setpoint being determined by calculating a difference between the operating parameter and a predetermined minimum threshold parameter or between the operating parameter and a predetermined maximum threshold parameter, by multiplying said difference by a coefficient relating to the operating parameter, by adding the rotational speed measurement to the result of the multiplication, and by taking, as limited speed setpoint, the maximum between the result of the addition and the rotational speed setpoint when the difference is calculated relative to a minimum threshold parameter, and the minimum between the result of the addition and the rotational speed setpoint when the difference is calculated relative to a maximum threshold parameter.

14. A turbine engine for an aircraft comprising:

a combustion chamber, a fuel metering valve including a metering slide, a position of which determines a volumetric flow rate of fuel injected into the combustion chamber and an actuator arranged to displace the metering slide depending on a control electric current, a position sensor arranged to measure a position of the metering slide and deliver a position measurement, a speed sensor arranged to measure a rotational speed of the turbine engine and deliver a rotational speed measurement, a monitoring unit arranged to deliver a rotational speed setpoint, to detect a failure of the position sensor and to deliver a failure signal in the case of detection of a failure of the position sensor, and the control system according to claim 10.

* * * * *